(12) United States Patent
Zhu et al.

(10) Patent No.: US 9,075,950 B2
(45) Date of Patent: Jul. 7, 2015

(54) INTEGRATING DISCOVERED AND USER-DEFINED GEOMETRIC RELATIONSHIPS

(71) Applicant: Siemens Product Lifecycle Management Software Inc., Plano, TX (US)

(72) Inventors: Yanong Zhu, Cambridge (GB); Douglas Joseph King, Peterborough (GB); Howard Charles Duncan Mattson, Cambridge (GB)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 365 days.

(21) Appl. No.: 13/627,143

(22) Filed: Sep. 26, 2012

(65) Prior Publication Data
US 2014/0012549 A1 Jan. 9, 2014

Related U.S. Application Data

(60) Provisional application No. 61/668,794, filed on Jul. 6, 2012.

(51) Int. Cl.
*G06F 17/50* (2006.01)
(52) U.S. Cl.
CPC ............ *G06F 17/5086* (2013.01); *G06F 17/50* (2013.01); *G06F 2217/06* (2013.01)
(58) Field of Classification Search
CPC .................................................. G06F 17/5009

USPC ......................................... 703/1; 700/97, 182
See application file for complete search history.

(56) References Cited

U.S. PATENT DOCUMENTS 6,915,243 B1 * 7/2005 Inoue et al. ....................... 703/2

OTHER PUBLICATIONS

Jiri Kripac, "A Mechanism for Persistently Naming Topological Entities in History-Based Parametric Solid Models" 1995, ACM 0-89791-672-7/95/0005, pp. 21-30.*
Notification of Transmittal of the International Search Report and the Written Opinion of the International Searching Authority, or the Declaration dated Aug. 26, 2013 in connection with International Patent Application No. PCT/US2013/049206.
(Continued)

*Primary Examiner* — Dwin M Craig

(57) ABSTRACT

Methods for product data management and corresponding systems and computer-readable mediums. A method includes receiving a three-dimensional CAD model in the data processing system, the CAD model including a plurality of geometries. The method includes receiving at least one system-found equivalence class (EC) including at least one of the geometries, the system-found EC being of a specified EC type, and receiving at least one persistent EC of the specified EC type including at least one of the geometries. The method includes completing any unique persistent member of the persistent EC by finding any other geometries in the CAD model that have an EC relationship with the unique persistent member of the specified EC type. The method includes expanding the user-defined persistent EC by adding any unique found members of the specified EC type to produce a combined EC, and storing and reusing the combined EC.

20 Claims, 9 Drawing Sheets

(56) References Cited

OTHER PUBLICATIONS

Wolfgang Sohrt, et al., "Interaction with Constraints in 3D Modeling", SMA '91 Proceedings of the First ACM Symposium on Solid Modeling Foundations and CAD/CAM Applications, Jun. 5, 1991, p. 387-396.

Michael L. Gleicher, "A Differential Approach to Graphical Interaction", Jan. 1, 1994, p. 1-250.

* cited by examiner

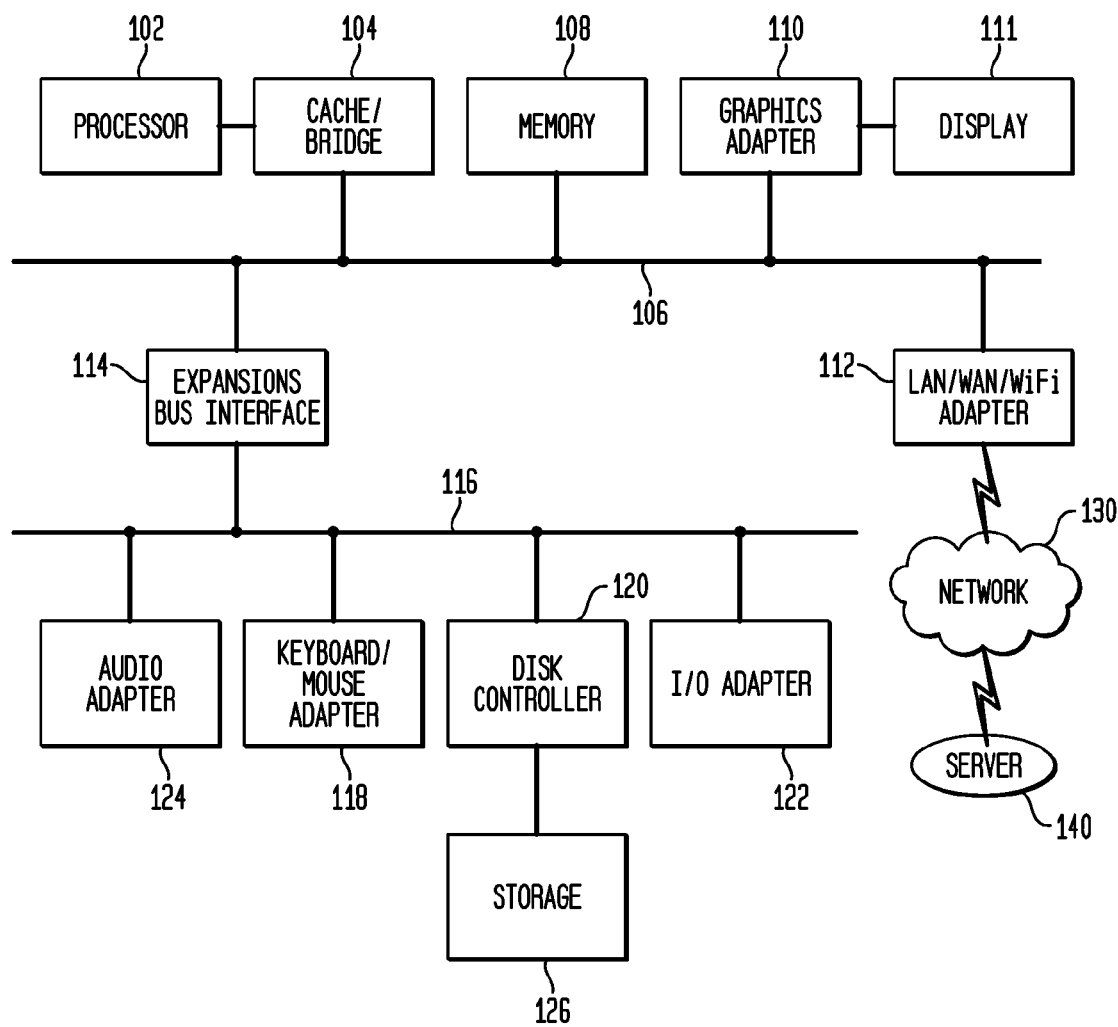

FIG. 5A

| CASES (GIVEN THE MEMBERS OF FOUND CLASSES) | CASE DESCRIPTION | ACTION AND STATE TRANSITIONS |
|---|---|---|
| 1. ALL NOT IN ANY PERSISTENT CLASS $N_p=0$ | | CREATE NEW CLASSES, ONE FOR EACH FOUND CLASS |
| 2. ALL IN A SINGLE PERSISTENT CLASS | | |
| 2a. ALL MEMBERS OF THE PERSISTENT CLASS ARE ALSO IN THE FOUND CLASSES | $N_p=1$ $N_{ff}=0$ $N_{pp}=0$ | REUSE THE PERSISTENT CLASS |
| 2b. SOME MEMBERS OF THE PERSISTENT CLASS ARE NOT IN THE FOUND CLASSES | $N_p=1$ $N_{ff}=0$ $N_{pp}>0$ | COMPLETE THE MEMBERS THAT ARE NOT IN THE FOUND CLASSES, WHICH MAY CONVERT THIS CASE TO CASE 2a, CASE 3a, CASE 4a OR CASE 4b. |
| 3. SOME IN A SINGLE PERSISTENT CLASS | | |
| 3a. ALL MEMBERS OF THE PERSISTENT CLASS ARE ALSO IN THE FOUND CLASSES | $N_{pc}=1$ $N_{ff}>0$ $N_{pp}=0$ | EXPAND THE PERSISTENT CLASS WITH NEW FOUND MEMBERS, WHICH CONVERT THIS CASE TO CASE 2a. |
| 3b. SOME MEMBERS OF THE PERSISTENT CLASSES ARE NOT IN THE FOUND CLASSES | $N_p=1$ $N_{ff}>0$ $N_{pp}>0$ | COMPLETE THE MEMBERS THAT ARE NOT IN FOUND CLASSES, WHICH MAY CONVERT THIS CASE TO CASE 3a, CASE 5a, OR CASE 5b. |
| 4. ALL IN MULTIPLE PERSISTENT CLASSES | | |
| 4a. ALL MEMBERS OF THE PERSISTENT CLASSES ARE ALSO IN THE FOUND CLASSES | $N_p>1$ $N_{ff}=0$ $N_{pp}=0$ | MERGE PERSISTENT CLASSES INTO THE FIRST, WHICH CONVERT THIS CASE TO CASE 2a. |
| 4b. SOME MEMBERS OF THE PERSISTENT CLASSES ARE NOT IN THE FOUND CLASSES | $N_p>1$ $N_{ff}=0$ $N_{pp}>0$ | COMPLETE THE MEMBERS THAT ARE NOT IN FOUND CLASSES, WHICH CONVERTS THIS CASE TO CASE 4a OR CASE 5a. |
| 5. SOME IN MULTIPLE PERSISTENT CLASSES | | |
| 5a. ALL MEMBERS OF THE PERSISTENT CLASSES ARE ALSO IN THE FOUND CLASSES | $N_p>1$ $N_{ff}>0$ $N_{pp}=0$ | MERGE PERSISTENT CLASSES INTO THE FIRST, WHICH CONVERT THIS CASE TO CASE 3a. |
| 5b. SOME MEMBERS OF THE PERSISTENT CLASSES ARE NOT IN THE FOUND CLASSES | $N_p>1$ $N_{ff}>0$ $N_{pp}>0$ | COMPLETE THE MEMBERS THAT ARE NOT IN FOUND CLASSES, WHICH CONVERTS THIS CASE TO CASE 5a. |

_US 9,075,950 B2_

INTEGRATING DISCOVERED AND USER-DEFINED GEOMETRIC RELATIONSHIPS

CROSS-REFERENCE TO OTHER APPLICATIONS

This application claims the benefit of the filing data of U.S. Provisional Patent Application 61/668,794, filed Jul. 6, 2012, which is hereby incorporated by reference. This application also shares subject matter in common with, but is otherwise unrelated to, concurrently filed U.S. patent application Ser. No. 13/627,133, filed Sep. 26, 2012, entitled "Identification and Management of Redundancy Within Geometric Relationships", which is hereby incorporated by reference.

TECHNICAL FIELD

The present disclosure is directed, in general, to computer-aided design, visualization, and manufacturing systems, product lifecycle management ("PLM") systems, and similar systems, that manage data for products and other items (collectively, "Product Data Management" systems or "PDM" systems).

BACKGROUND OF THE DISCLOSURE

PDM systems manage PLM and other data. Improved systems are desirable.

SUMMARY OF THE DISCLOSURE

Various disclosed embodiments include methods for product data management and corresponding systems and computer-readable mediums. A method includes receiving a three-dimensional CAD model in the data processing system, the CAD model including a plurality of geometries. The method includes receiving at least one system-found equivalence class (EC) including at least one of the geometries, the system-found EC being of a specified EC type, and receiving at least one persistent EC of the specified EC type including at least one of the geometries. The method includes completing any unique persistent member of the persistent EC by finding any other geometries in the CAD model that have an EC relationship with the unique persistent member of the specified EC type. The method includes expanding the user-defined persistent EC by adding any unique found members of the specified EC type to produce a combined EC, and storing and reusing the combined EC.

The foregoing has outlined rather broadly the features and technical advantages of the present disclosure so that those skilled in the art may better understand the detailed description that follows. Additional features and advantages of the disclosure will be described hereinafter that form the subject of the claims. Those skilled in the art will appreciate that they may readily use the conception and the specific embodiment disclosed as a basis for modifying or designing other structures for carrying out the same purposes of the present disclosure. Those skilled in the art will also realize that such equivalent constructions do not depart from the spirit and scope of the disclosure in its broadest form.

Before undertaking the DETAILED DESCRIPTION below, it may be advantageous to set forth definitions of certain words or phrases used throughout this patent document: the terms "include" and "comprise," as well as derivatives thereof, mean inclusion without limitation; the term "or" is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, whether such a device is implemented in hardware, firmware, software or some combination of at least two of the same. It should be noted that the functionality associated with any particular controller may be centralized or distributed, whether locally or remotely. Definitions for certain words and phrases are provided throughout this patent document, and those of ordinary skill in the art will understand that such definitions apply in many, if not most, instances to prior as well as future uses of such defined words and phrases. While some terms may include a wide variety of embodiments, the appended claims may expressly limit these terms to specific embodiments.

BRIEF DESCRIPTION OF THE DRAWINGS

For a more complete understanding of the present disclosure, and the advantages thereof, reference is now made to the following descriptions taken in conjunction with the accompanying drawings, wherein like numbers designate like objects, and in which:

FIG. 1 depicts a block diagram of a data processing system in which an embodiment can be implemented;

FIG. 5A is a table of possible cases that can be derived from a generic case as disclosed herein;

DETAILED DESCRIPTION

Figure 2A:
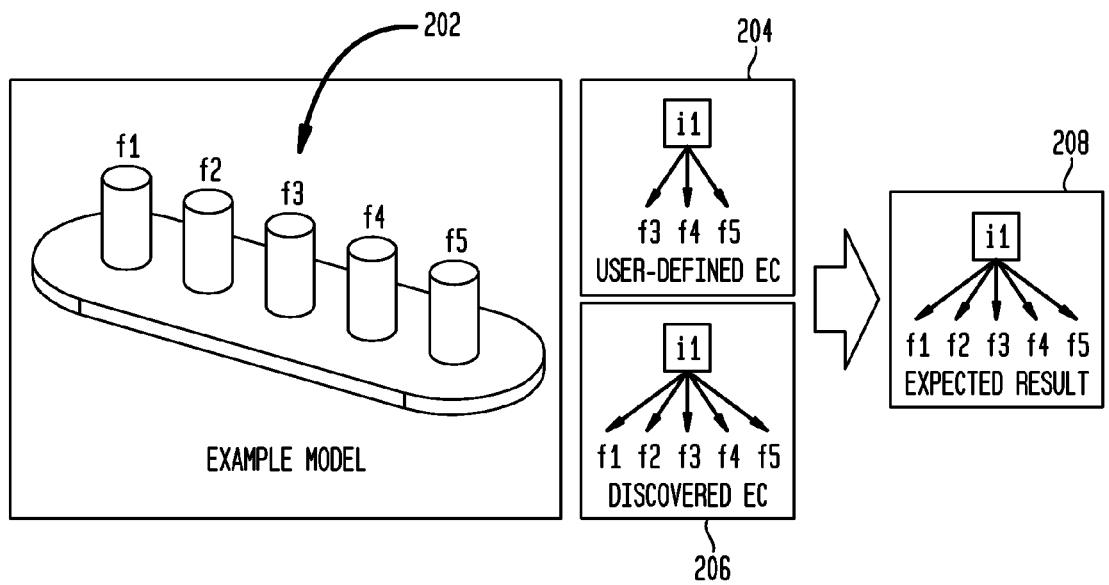
FIGS. 2A and 2B depict an exemplary CAD model 202 and corresponding relationship graphs illustrating discovered, user-defined, and merged equivalence classes, in accordance with disclosed embodiments.

FIGS. 1 through 6E, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged device. The numerous innovative teachings of the present application will be described with reference to exemplary non-limiting embodiments.

PDM systems can perform processes including processes that recognize a variety of geometric relationship between elements or features of an object mode. Such processes allow users to edit models while retaining important design features. Some such processes are described in commonly-assigned U.S. patent application Ser. Nos. 13/529,061 and 13/529,066, both filed Jun. 21, 2012, which are hereby incorporated by reference. Some specific relationships, described in these incorporated applications and referred to herein as "equivalence classes", describe equivalences between geometries and include relationships such as Identical (geometries share the same type and all components); Same Center (geometries share the same center component); Same Axis (geometries share the same axis component); Same Plane (geometries share the same plane component); Same Shape (geometries that share the same type, and same radius, major and minor radii, or half angle component); Same Direction (geometries share the same direction, aligned or anti-aligned), Symmetrical, and others.

Synchronous technology, as referred to herein, describes systems and methods for editing and manipulation of CAD models including any combination of constraint-driven, history-based, or history-free models. Synchronous technology provides fast, intuitive editing of CAD models. In some embodiments, equivalence classes are used to efficiently and completely represent relationships within the model.

Relationships within the model can be both automatically found by the system and defined by the user. To ensure the system is intuitive and the basic properties of equivalence classes are preserved, and to ensure efficiency, any found relationships and user-defined relationships which overlap are merged. Disclosed embodiments include systems and methods for the desired behaviors and processes for achieving these behaviors.

FIG. 1 depicts a block diagram of a data processing system in which an embodiment can be implemented, for example as a PDM system particularly configured by software or otherwise to perform the processes as described herein, and in particular as each one of a plurality of interconnected and communicating systems as described herein. The data processing system depicted includes a processor 102 connected to a level two cache/bridge 104, which is connected in turn to a local system bus 106. Local system bus 106 may be, for example, a peripheral component interconnect (PCI) architecture bus. Also connected to local system bus in the depicted example are a main memory 108 and a graphics adapter 110. The graphics adapter 110 may be connected to display 111.

Other peripherals, such as local area network (LAN)/Wide Area Network/Wireless (e.g. WiFi) adapter 112, may also be connected to local system bus 106. Expansion bus interface 114 connects local system bus 106 to input/output (I/O) bus 116. I/O bus 116 is connected to keyboard/mouse adapter 118, disk controller 120, and I/O adapter 122. Disk controller 120 can be connected to a storage 126, which can be any suitable machine usable or machine readable storage medium, including but not limited to nonvolatile, hard-coded type mediums such as read only memories (ROMs) or erasable, electrically programmable read only memories (EEPROMs), magnetic tape storage, and user-recordable type mediums such as floppy disks, hard disk drives and compact disk read only memories (CD-ROMs) or digital versatile disks (DVDs), and other known optical, electrical, or magnetic storage devices.

Also connected to I/O bus 116 in the example shown is audio adapter 124, to which speakers (not shown) may be connected for playing sounds. Keyboard/mouse adapter 118 provides a connection for a pointing device (not shown), such as a mouse, trackball, trackpointer, etc.

Those of ordinary skill in the art will appreciate that the hardware depicted in FIG. 1 may vary for particular implementations. For example, other peripheral devices, such as an optical disk drive and the like, also may be used in addition or in place of the hardware depicted. The depicted example is provided for the purpose of explanation only and is not meant to imply architectural limitations with respect to the present disclosure.

A data processing system in accordance with an embodiment of the present disclosure includes an operating system employing a graphical user interface. The operating system permits multiple display windows to be presented in the graphical user interface simultaneously, with each display window providing an interface to a different application or to a different instance of the same application. A cursor in the graphical user interface may be manipulated by a user through the pointing device. The position of the cursor may be changed and/or an event, such as clicking a mouse button, generated to actuate a desired response.

One of various commercial operating systems, such as a version of Microsoft Windows™, a product of Microsoft Corporation located in Redmond, Wash. may be employed if suitably modified. The operating system is modified or created in accordance with the present disclosure as described.

LAN/WAN/Wireless adapter 112 can be connected to a network 130 (not a part of data processing system 100), which can be any public or private data processing system network or combination of networks, as known to those of skill in the art, including the Internet. Data processing system 100 can communicate over network 130 with server system 140, which is also not part of data processing system 100, but can be implemented, for example, as a separate data processing system 100.

The discovery of geometric relationships using equivalence class based algorithms can produce a full yet efficient representation of all geometrically-true relationships in a CAD model, as described in the applications incorporated above, but other relationships may be desired by a user. Often, when editing a CAD model, the user wishes to manually define some geometric conditions that need to be solved or maintained. In an equivalence class-based system, these user-defined relationships can be represented using the equivalence classes described herein. In addition, further equivalence classes can be automatically found by the system during the geometric finding stage of any synchronous edit.

Often, these user-defined equivalence classes are different from discovered equivalence classes. This difference can be caused naturally, for example when the user-defined equivalence classes represent a subset of geometrically-true conditions in the model, or when the user-defined equivalence classes are not in a geometrically-satisfied state. These equivalence classes may contain more members than the discovered equivalence classes, or contain members that belong to multiple discovered equivalence classes of the same type.

According to disclosed embodiments, a geometry cannot be a member of more than one equivalence class of a certain type. This means that when discovered equivalence classes and user-defined equivalence classes share some common members, a robust process is used to merge these equivalence classes so that the resultant equivalence classes are both valid and complete.

Disclosed embodiments construct a single equivalence class structure that integrates both user-defined and geometrically discovered equivalence classes. The integrated structure, which must be valid and complete, can then be fed into subsequent processing phases, such that both user-defined and discovered geometric relationships are solved and maintained.

FIG. 2A depicts an exemplary CAD model 202 and corresponding relationship graphs illustrating discovered, user-defined, and merged equivalence classes, in accordance with disclosed embodiments, and is used to demonstrate techniques disclosed herein.

In the example of FIG. 2A, all five top faces {f1, f2, f3, f4, f5} of the model 202 are coincident. The user has defined an Identical equivalence class containing {f3, f4, f5} as shown in relationship graph 204. The system's automatic discovery process, described in the related applications incorporated above, discovers an Identical equivalence class that includes all five top faces {f1, f2, f3, f4, f5}, as shown in the relationship graph 206.

The output of the integration process described herein is a single Identical equivalence class that includes all five top faces {f1, f2, f3, f4, f5}, as shown in the relationship graph 208.

Figure 2B:
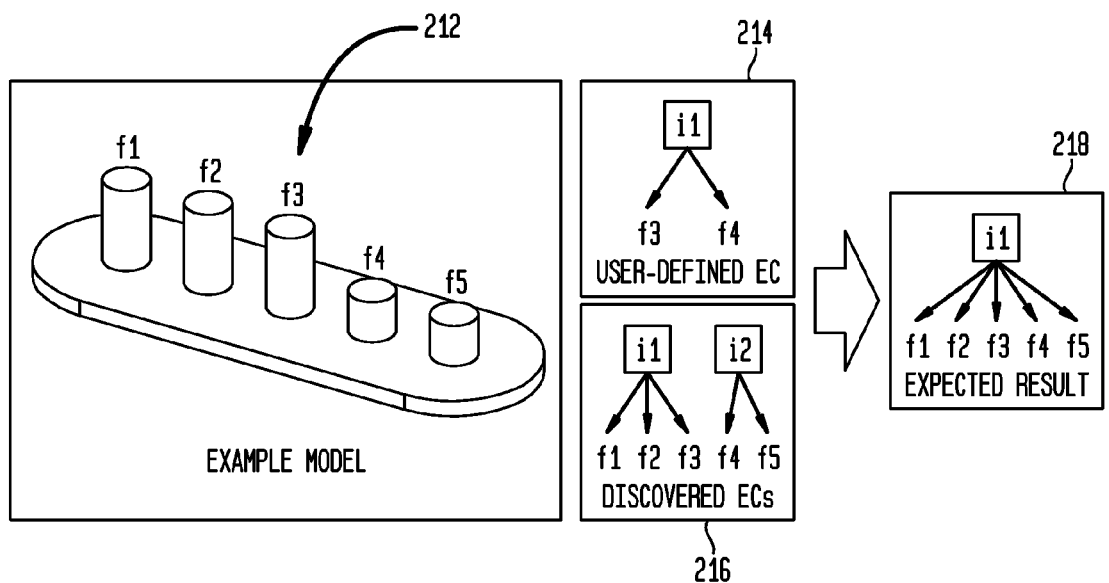

FIG. 2B depicts an exemplary CAD model 212 and corresponding relationship graphs illustrating discovered, user-defined, and merged equivalence classes, in accordance with disclosed embodiments, and is used to demonstrate techniques disclosed herein.

In the example, of FIG. 2B, there are two sets of coincident faces in the model 212, {f1, f2, f3} and {f4, f5}. The user has defined an Identical equivalence class containing {f3, f4} as shown in relationship graph 214. The system's automatic discovery process, described in the related applications incorporated above, discovers two Identical equivalence classes that include {f1, f2, f3} and {f4, f5}, respectively, as shown in the relationship graph 216.

The output of the integration process described herein is a single Identical equivalence class that includes all five top faces {f1, f2, f3, f4, f5}, as shown in the relationship graph 218. Note that face f4 is defined by the user to be Identical to face f3, and the system has identified that face f4 is Identical to face f5, and face f3 is Identical to faces f1 and f2.

According to disclosed embodiments, any of these combinations can be derived from a generic case. To describe this generic case, the following terminology is used:

| Name | Meaning |
| --- | --- |
| F | A found equivalence class (EC) |
| P | A user-defined (persistent) equivalence class |
| Fm | A member of a found EC |
| Fp | A member of a found EC that is also a member of a user-defined EC of the same type |
| Ff | A member of a found EC that does not belong to any persistent ECs of the same type |
| Pm | A member of a user-defined EC |
| Pf | A member of a user-defined EC that is also a member of a found EC of the same type |
| Pp | A member of a user-defined EC that is not found as part of any found EC of the same type as the persistent EC |
| $N_{(subscript)}$ | The number of objects specified by "subscript", which can be any of the objects named above. |

Figure 3:
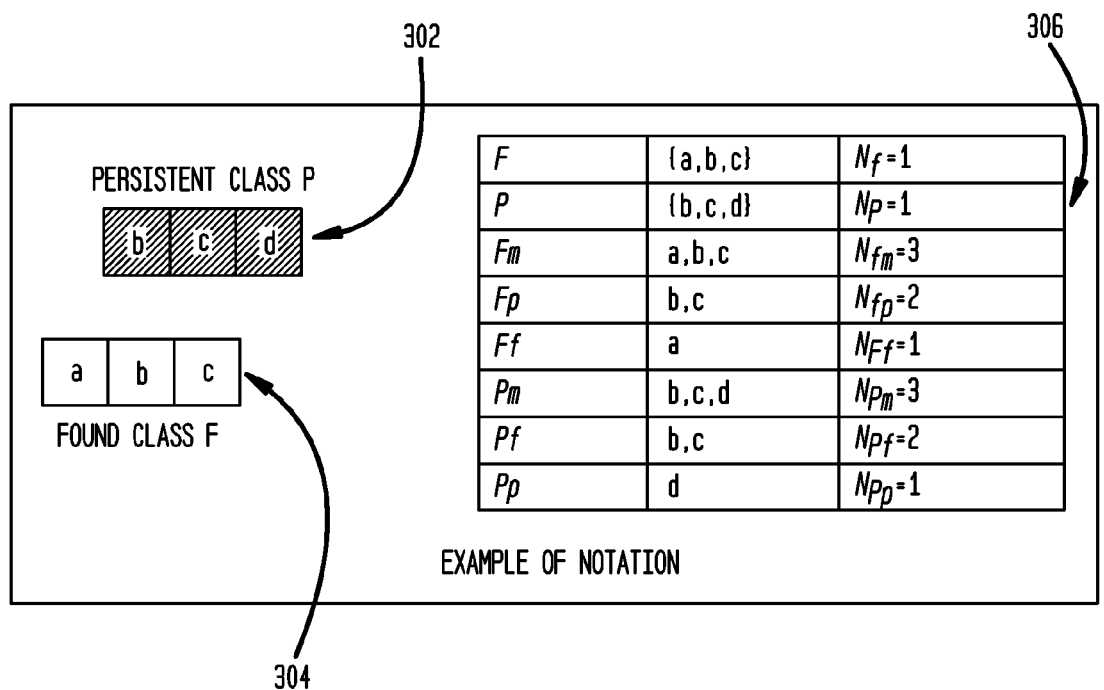
FIG. 3 depicts an example of the use of a notation in accordance with disclosed embodiments.

FIG. 3 depicts an example of the above notation. That shows that the user-defined persistent EC P 302 has members {b, c, d} and the system-found EC F 304 has members {a, b, c}. The remaining values, according to the notation above, are shown in table 506. The terms "user-defined" and "persistent" may be used interchangeably herein.

Using this notation, in accordance with disclosed embodiments, the generic case can then be described to have the following properties, given $N_F$ found ECs of the same type with $N_{Fm}$ members in total (where $N_F>=1$):

In total $N_{Fp}$ members ($N_{Fm}>=N_{Fp}>=0$) of these found classes belong to $N_P$ persistent classes ($N_P>=0$);

All other $N_{Ff}$ members do not belong to any persistent classes (note that $N_{Fp}+N_{Ff}=N_{Fm}$);

In total $N_{Pf}$ members ($N_{Pm}>=N_{Pf}>0$) of the persistent classes belong to the found classes;

All other $N_{Pp}$ members of the persistent classes do not belong to any found classes (note that $N_{Pp}+N_{Pf}=N_{Pm}$);

Note that $N_{Fp}$ is always equal to $N_{Pf}$, as they both represent the number of common members between the found and persistent classes.

Figure 4:
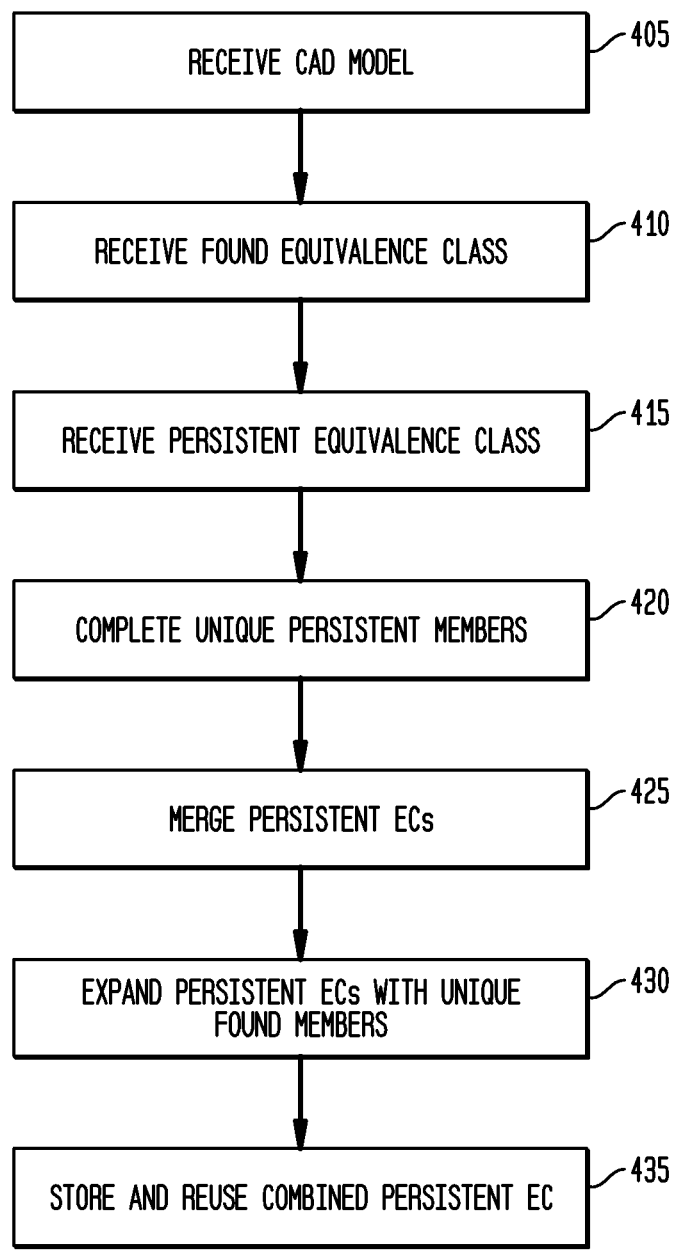
FIG. 4 depicts a flowchart of a process in accordance with disclosed embodiments.

FIG. 4 depicts a flowchart of process in accordance with disclosed embodiments that handles this generic integration case. The description below includes specific processes of CREATE, COMPLETE, MERGE, EXPAND, and REUSE.

The system receives a CAD model (step 405). Receiving, as used herein, can include loading from storage, receiving from another device or process, receiving via an interaction with a user, and otherwise.

The system receives at least one found equivalence class including at least one member geometry (step 410). This step can include performing a discovery process to discover the equivalent geometries and to assign them to equivalence classes. In a typical case, there will be a number of ECs, each having multiple members. In terms of the notation above, the system receives at least one EC F, where $N_F=>1$ and $N_{Fm}=>1$. This process can be performed for any of the EC types described above.

The system receives at least one user-defined persistent equivalence class including at least one member geometry (step 415). In terms of the notation above, the system receives at least one EC P, where $N_P=>1$ and $N_{Pm}=>1$. This step can include interacting with the user to receive the user's selection or definition of the EC. In a typical case, there will be a number of ECs, each having multiple members.

Note that if there are no user-defined ECs, that is, when $N_P=0$, then there is no need to perform an integration process as described herein. The system can simply use or CREATE the found ECs, such as by creating a new class for each of the $N_F$ found classes.

Where there is a persistent member of a user-defined EC that is not part of any found EC of the same type as the persistent EC (the $P_p$ members, referred to as a "unique persistent member" herein), the system performs a COMPLETE step on each unique persistent member by performing a geometric find from each of those members to identify any other geometries that have an EC relationship of that same EC type (step 420). As a result of the completion, each unique persistent member is assigned to a found EC, even if it is the only member of that found EC. No more new members of these EC type will be found after these persistent members are completed, in various embodiments; after this step, $N_{Pp}$ will be 0.

The system merges all user-defined ECs of a given type into a single user-defined EC of that type (step 425) in a MERGE step. After this step, $N_P$ will be 1.

When there is a found member of a found EC that is not part of any persistent user-defined EC of the same EC type (the $F_f$ members, referred to as a "unique found member" herein), the system adds the unique found members of that EC type to the user-defined EC of that type (step 430). This is referred to herein as "EXPANDING" the user-defined EC for that type. After this step, $N_{Ff}$ will be 0. The expanded EC for that type is referred to as a "combined equivalence class".

The system thereafter stores the combined equivalence class and REUSES it as the class returned to any user or process requiring the corresponding found EC (step 435).

FIG. 5A is a table of possible cases that can be derived from the above generic case, and the actions that are needed to convert these cases to a simplest case that can be handled by a REUSE process as in step 425 above. This table includes additional steps that convert the different cases eventually to case 2a, a direct REUSE case. The process of FIG. 4 is a generic case that generally corresponds to conversion of case 2b into case 2a.

Figure 5B:
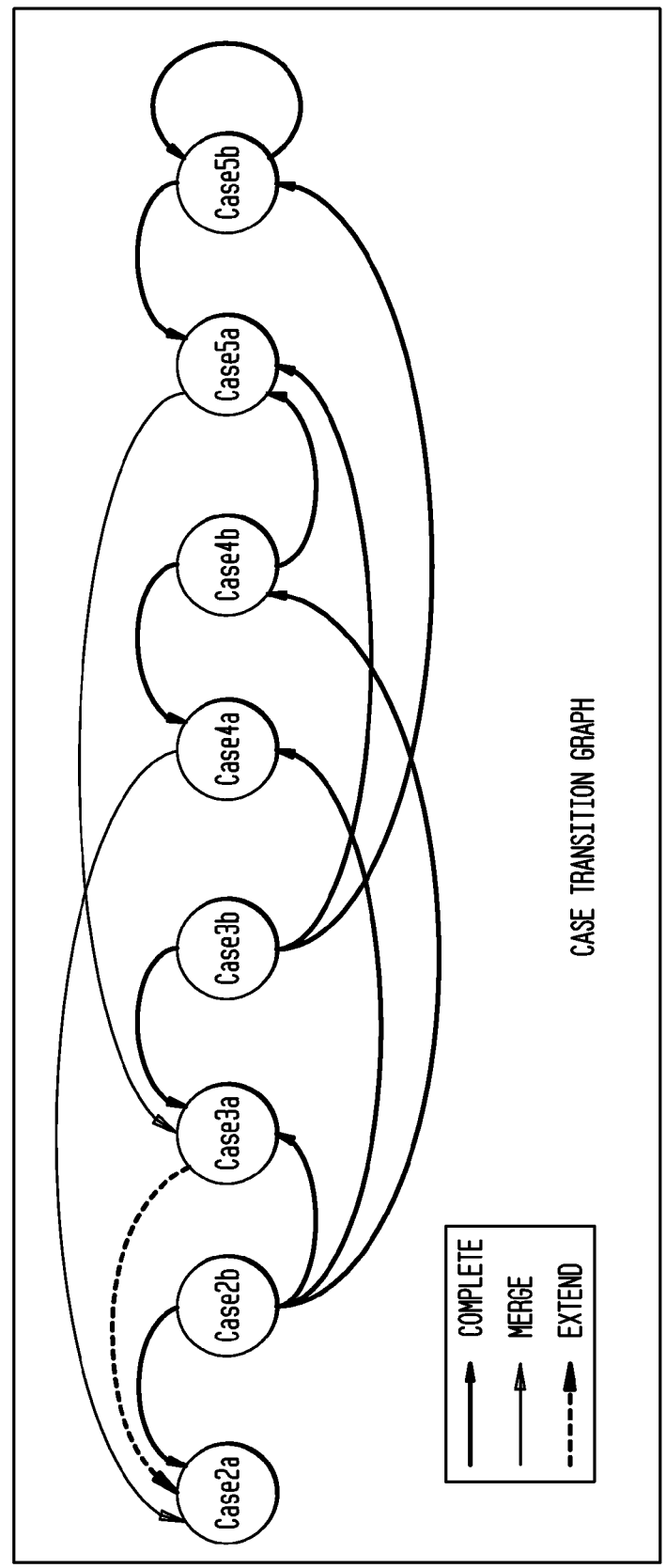
FIG. 5B shows a case transition graph corresponding to the table of FIG. 5A.

FIG. 5B shows a case transition graph corresponding to the table in FIG. 5A. It is important to notice that Case 2a is the simplest case where the persistent class can just be reused, and all cases can be converted into Case 2a. In other words, at least one directed route exists in the graph between each case and Case 2a, using steps as shown in the process of FIG. 4.

FIGS. 6A-6E depict a number of examples for some typical cases described in the table of FIG. 5A. Note that any of these cases are used for a single type of EC, and these processes do not mix or combine different types of ECs.

Figure 6A:
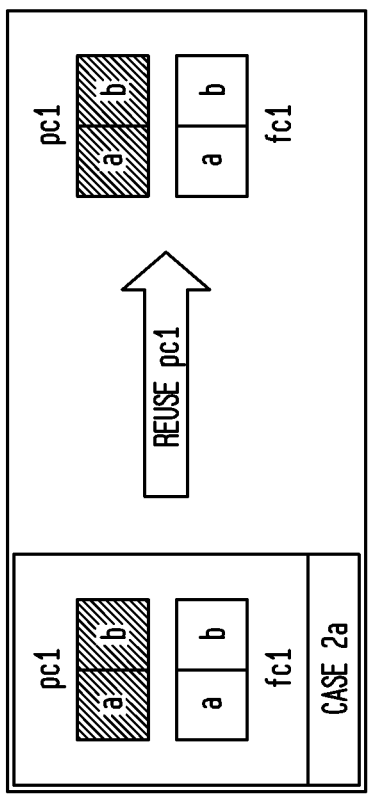
FIGS. 6A-6E depict a number of examples for some typical cases described in the table of FIG. 5A.

FIG. 6A depicts the simple case 2a. In this case, a first found class fc1 is found. All of its members belong to the existing persistent class pc1, and pc1 doesn't contain any other members. This is the simplest reuse case, so the system can just REUSE pc1.

Figure 6B:
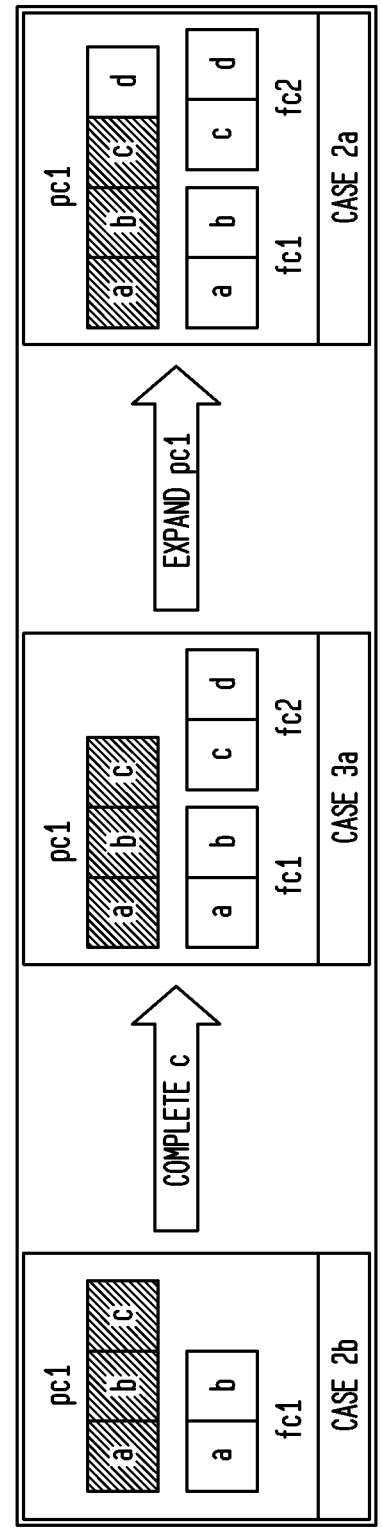

FIG. 6B depicts the more advanced case 2b. In this case, found class fc1 is found first. The system determines that persistent class pct has one extra member, c. The system will COMPLETE c, which brings in d as a new member. This now becomes a case 3a. The system then EXPANDs pc1 to include d. The final output EC is pc1, now with four members including d.

Figure 6C:
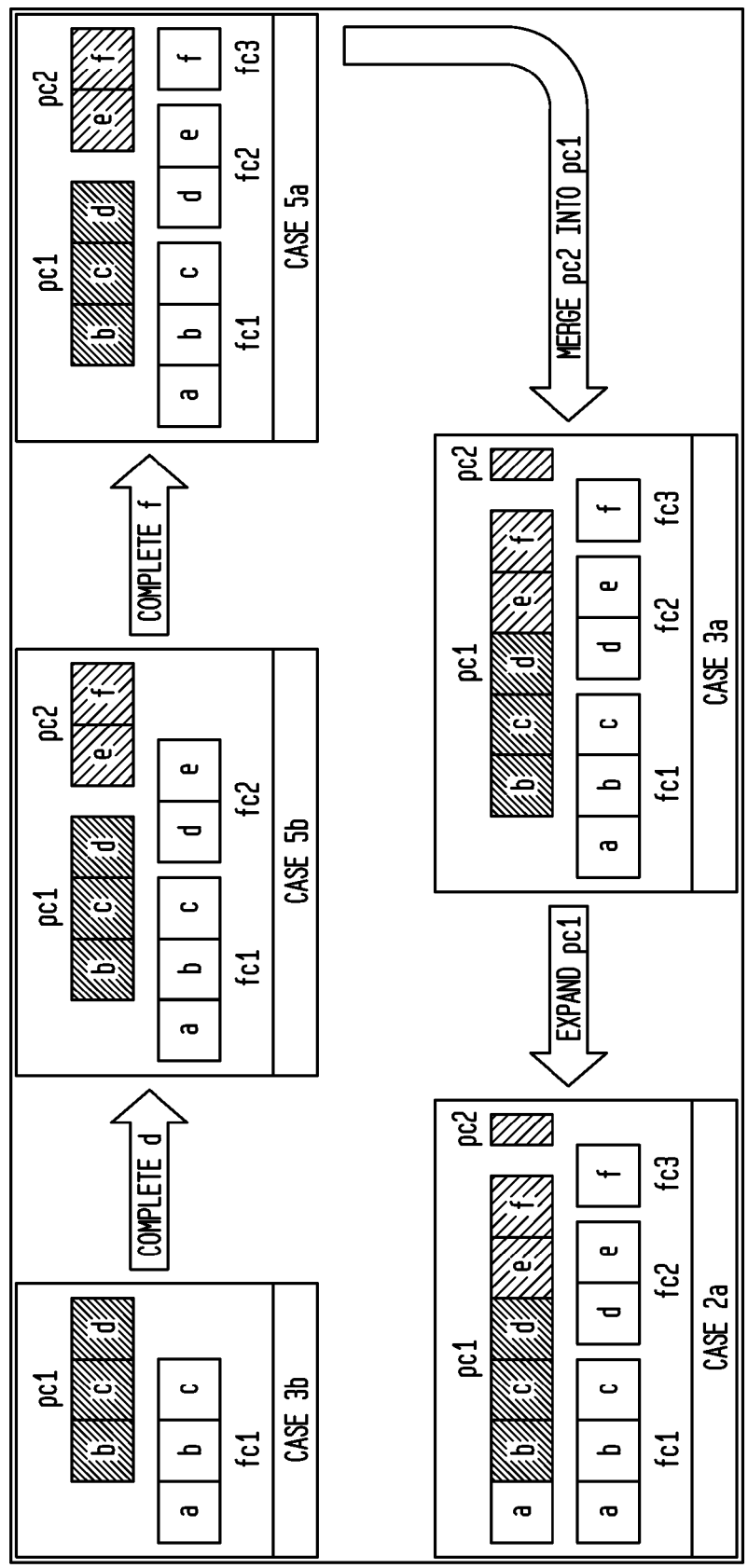

FIG. 6C depicts a case 3b. In this case, found class fc1 has some members that belong to an existing persistent EC class pc1. Persistent class pc1 contains an extra member, d. COMPLETING d does bring in a new found class, fc2, which contains an extra member, e. Member e belongs to another persistent class, pc2. This is now a case 5b. Persistent class pc2 contains an extra member f. COMPLETING f converts to case 5a. A MERGE of pc2 into pc1 then converts to case 3a. The system will EXPAND pc1 to include a, which converts it to a case 2a described above.

Figure 6D:
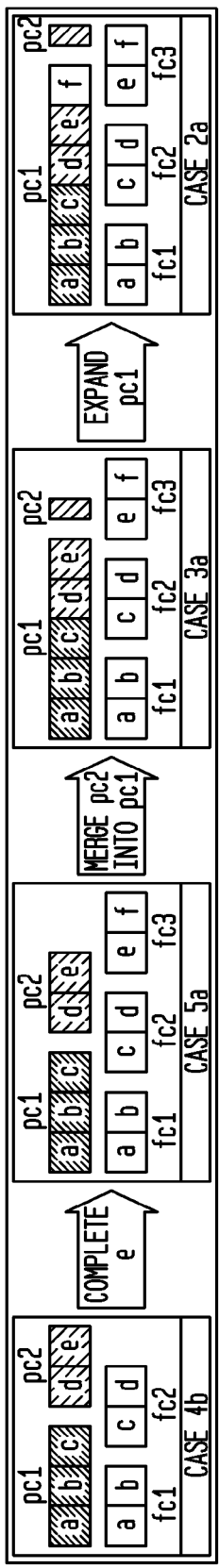

FIG. 6D depicts a case 4b. In this case, pc2 has an extra member that is not found. COMPLETING this member brings in a new found class, fc3, which has an extra member, f. This is now a case 5a The system will MERGE pc2 into pc1, which converts this to a case 3a, then EXPAND pc1 to include f. This is now a case 2a.

Figure 6E:
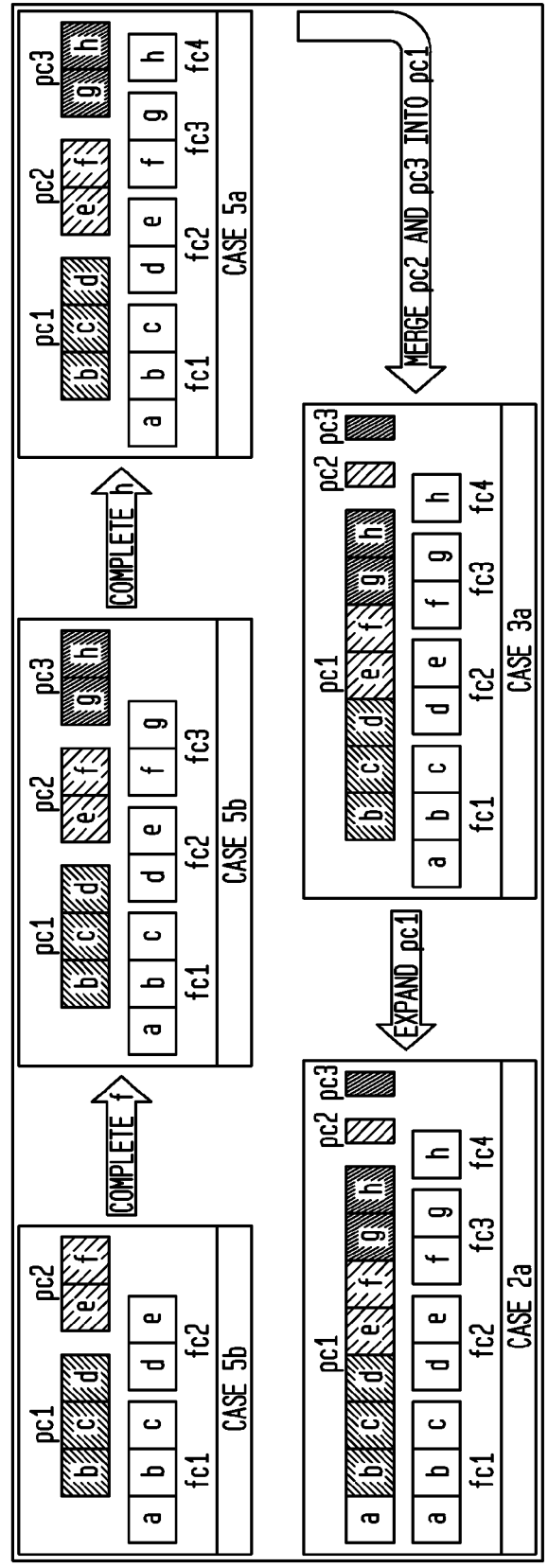

FIG. 6E depicts a case 5b. The member f of pc2 is not found. COMPLETING f does bring in a new found class, fc3, where g is contained in another persistent class pc3. Class pc3 also has an extra member, h. This is still a case 5b. COMPLETING h does not being in any new persistent classes, so this is now case 5a. After MERGING pc2 and pc3 into pc1, and EXPANDING pc1 to include a, this is converted to a case 2a.

It can be seen from the above examples that the final found EC may contain members from three types of origin: members that are originally in this EC; members that are merged into this EC from other ECs; and members that are added to this EC during geometric finding.

This information can be preserved during the integration process, and made available for the user to query, when it is necessary to differentiate the origins of the members in a given Equivalence Class.

Using processes as disclosed herein, the system can merge found and user-defined relationships so that the communication of the system with the user is clear, with the system presenting a single merged set of relationships to manipulate to get the desired edit behavior. The merging can include unsatisfied user-defined relationships.

As described above, when two or more user-defined relationships are created and do not initially overlap, but are subsequently made to overlap by additional system-found relationships, all of these EC relationships can be merged together to a single EC relationship.

In various embodiments, the user-defined EC relationships are given preference over system-found relationships, thus preserving any naming the user may have assigned.

The system can preserve the basic mathematical Equivalence Class definition that a geometry is only a member of one class of a given type; this property is valuable in preserving the performance advantages of using an Equivalence-Class-based solution.

Of course, those of skill in the art will recognize that, unless specifically indicated or required by the sequence of operations, certain steps in the processes described above may be omitted, performed concurrently or sequentially, or performed in a different order. Any of the other features and processes described above can be included in the process of FIG. 4.

Those skilled in the art will recognize that, for simplicity and clarity, the full structure and operation of all data processing systems suitable for use with the present disclosure is not being depicted or described herein. Instead, only so much of a data processing system as is unique to the present disclosure or necessary for an understanding of the present disclosure is depicted and described. The remainder of the construction and operation of data processing system 100 may conform to any of the various current implementations and practices known in the art.

It is important to note that while the disclosure includes a description in the context of a fully functional system, those skilled in the art will appreciate that at least portions of the mechanism of the present disclosure are capable of being distributed in the form of instructions contained within a machine-usable, computer-usable, or computer-readable medium in any of a variety of forms, and that the present disclosure applies equally regardless of the particular type of instruction or signal bearing medium or storage medium utilized to actually carry out the distribution. Examples of machine usable/readable or computer usable/readable mediums include: nonvolatile, hard-coded type mediums such as read only memories (ROMs) or erasable, electrically programmable read only memories (EEPROMs), and user-recordable type mediums such as floppy disks, hard disk drives and compact disk read only memories (CD-ROMs) or digital versatile disks (DVDs).

Although an exemplary embodiment of the present disclosure has been described in detail, those skilled in the art will understand that various changes, substitutions, variations, and improvements disclosed herein may be made without departing from the spirit and scope of the disclosure in its broadest form.

None of the description in the present application should be read as implying that any particular element, step, or function is an essential element which must be included in the claim scope: the scope of patented subject matter is defined only by the allowed claims. Moreover, none of these claims are intended to invoke paragraph six of 35 USC §112 unless the exact words "means for" are followed by a participle.

What is claimed is:

1. A method for product data management, the method performed by a data processing system and comprising:
    receiving a three-dimensional CAD model in the data processing system, the CAD model including a plurality of geometries;
    receiving at least one system-found equivalence class (EC) including at least one of the geometries, the system-found EC being of a specified EC type;
    receiving at least one persistent EC of the specified EC type including at least one of the geometries;
    completing any unique persistent member of the persistent EC by finding any other geometries in the CAD model that have an EC relationship with the unique persistent member of the specified EC type;

expanding the user-defined persistent EC by adding any unique found members of the specified EC type to produce a combined EC; and storing and reusing the combined EC.

2. The method of claim 1, wherein the EC type is one of Identical, Same Center, Same Axis, Same Plane, Same Shape, Same Direction, and Symmetrical.

3. The method of claim 1, wherein the data processing system also merges all persistent ECs of the specified EC type into a single persistent EC.

4. The method of claim 1, wherein the unique found member is a geometry of a system-found EC that is not part of any persistent EC of the specified EC type.

5. The method of claim 1, wherein the unique persistent member is a geometry of a persistent EC that is not part of any system-found EC of the specified EC type.

6. The method of claim 1, wherein completing any unique persistent member of the persistent EC includes assigning each unique persistent member to a system-found EC.

7. The method of claim 1, wherein reusing the combined EC includes returning the combined EC to a user or process that requests a corresponding system-found EC.

8. A data processing system comprising:
a processor; and
an accessible memory, the data processing system particularly configured to
receive a three-dimensional CAD model in the data processing system, the CAD model including a plurality of geometries;
receive at least one system-found equivalence class (EC) including at least one of the geometries, the system-found EC being of a specified EC type;
receive at least one persistent EC of the specified EC type including at least one of the geometries;
complete any unique persistent member of the persistent EC by finding any other geometries in the CAD model that have an EC relationship with the unique persistent member of the specified EC type;
expand the user-defined persistent EC by adding any unique found members of the specified EC type to produce a combined EC; and
store and reuse the combined EC.

9. The data processing system of claim 8, wherein the EC type is one of Identical, Same Center, Same Axis, Same Plane, Same Shape, Same Direction, and Symmetrical.

10. The data processing system of claim 8, wherein the data processing system also merges all persistent ECs of the specified EC type into a single persistent EC.

11. The data processing system of claim 8, wherein the unique found member is a geometry of a system-found EC that is not part of any persistent EC of the specified EC type.

12. The data processing system of claim 8, wherein the unique persistent member is a geometry of a persistent EC that is not part of any system-found EC of the specified EC type.

13. The data processing system of claim 8, wherein completing any unique persistent member of the persistent EC includes assigning each unique persistent member to a system-found EC.

14. The data processing system of claim 8, wherein reusing the combined EC includes returning the combined EC to a user or process that requests a corresponding system-found EC.

15. A non-transitory computer-readable medium encoded with executable instructions that, when executed, cause one or more data processing systems to:
receive a three-dimensional CAD model in the data processing system, the CAD model including a plurality of geometries;
receive at least one system-found equivalence class (EC) including at least one of the geometries, the system-found EC being of a specified EC type;
receive at least one persistent EC of the specified EC type including at least one of the geometries;
complete any unique persistent member of the persistent EC by finding any other geometries in the CAD model that have an EC relationship with the unique persistent member of the specified EC type;
expand the user-defined persistent EC by adding any unique found members of the specified EC type to produce a combined EC; and
store and reuse the combined EC.

16. The computer-readable medium of claim 15, wherein the EC type is one of Identical, Same Center, Same Axis, Same Plane, Same Shape, Same Direction, and Symmetrical.

17. The computer-readable medium of claim 15, wherein the data processing system also merges all persistent ECs of the specified EC type into a single persistent EC.

18. The computer-readable medium of claim 15, wherein the unique found member is a geometry of a system-found EC that is not part of any persistent EC of the specified EC type, and the unique persistent member is a geometry of a persistent EC that is not part of any system-found EC of the specified EC type.

19. The computer-readable medium of claim 15, wherein completing any unique persistent member of the persistent EC includes assigning each unique persistent member to a system-found EC.

20. The computer-readable medium of claim 15, wherein reusing the combined EC includes returning the combined EC to a user or process that requests a corresponding system-found EC.

* * * * *